(12) United States Patent
Araki

(10) Patent No.: US 7,955,067 B2
(45) Date of Patent: Jun. 7, 2011

(54) TRANSFER APPARATUS AND MOLDING PRODUCTION APPARATUS HAVING THE TRANSFER APPARATUS

(75) Inventor: Mamoru Araki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 678 days.

(21) Appl. No.: 12/007,429

(22) Filed: Jan. 10, 2008

(65) Prior Publication Data

US 2008/0213422 A1  Sep. 4, 2008

(30) Foreign Application Priority Data

Feb. 15, 2007 (JP) .................. 2007-035405

(51) Int. Cl.
*B29C 45/42* (2006.01)
*B29C 31/08* (2006.01)
(52) U.S. Cl. .................... 425/126.1; 425/444
(58) Field of Classification Search ............ 425/126.1, 425/444
See application file for complete search history.

(56) References Cited

U.S. PATENT DOCUMENTS

| 4,368,018 A | * | 1/1983 | Rees et al. | ............ 425/138 |
| 4,571,320 A | * | 2/1986 | Walker | ............ 425/444 |
| 5,520,876 A | * | 5/1996 | Dobler | ............ 425/126.1 |
| 5,527,174 A | * | 6/1996 | Godin et al. | ............ 425/126.1 |

FOREIGN PATENT DOCUMENTS

JP    H9-201849    8/1997

* cited by examiner

*Primary Examiner* — Robert B Davis
(74) *Attorney, Agent, or Firm* — Edwards Angell Palmer & Dodge LLP

(57) ABSTRACT

The present invention is to provide a transfer apparatus and a molded article production apparatus having the transfer apparatus. These apparatus can improve the working efficiency and control cost and space for arranging. A molded article production apparatus has a transfer apparatus and an injection molding apparatus. The transfer apparatus has an attaching part mounting a jig which a bus bar and a terminal are mounted on, and a molded box body. The attaching part has a main body, a component attaching part and a molded article attaching part. The component attaching part is arranged on one surface side of the main body, and mounts the jig which the bus bar and the terminal are mounted on. The molded article attaching part is arranged on another surface side of the main body, and mounts the box body formed by the injection molding apparatus.

3 Claims, 11 Drawing Sheets

TRANSFER APPARATUS AND MOLDING PRODUCTION APPARATUS HAVING THE TRANSFER APPARATUS

The priority application Number Japan Patent Application No. 2007-035405 upon which this patent application is based is hereby incorporated by reference.

BACKGROUND OF THE INVENTION

1. Filed of the Invention

The present invention relates to a transfer apparatus providing and a molded article production apparatus having the transfer apparatus. The transfer apparatus provides a component for insert molding to a die by insert molding, and removes a molded article which is formed by the die from the die.

2. Description of the Related Art

Generally, various electronic devices, for example a light such as headlights and a rear light, and a motor such as a starter motor and a motor for air condition, are mounted in a vehicle as a mobile object.

A junction block is arranged in appropriate place of the vehicle so as to provide electrical power into the above mentioned various electronic devices. The junction block is included by putting together various electronic circuit units of multiple fuses and relays.

A junction block has a fuse, a relay or a bus bar. Thereby, the junction block is called a fuse block, a relay box, or an electronic connection box. In the present invention, the above fuse block, the relay box and the junction block are called an electronic connection box as a generic name in the below.

The above mentioned electric connection box has a box body forming an outer case of it and a wiring block. The box body is made of an insulation synthetic resin, and is formed into a box shape. Electrical part, for example a relay and a fuse, and a connector of a wiring harness are mounted on the box body.

The wiring block has a conductive bus bar, which is buried into the box body, and a terminal. The wiring block connects electrically each other the electrical part, which are attached to the box body, and the terminal of the connector of the wiring harness in a predetermined pattern.

The bus bar and the terminal constituting the wiring block are set into a cavity of die for insert molding, and the cavity is filled with synthetic resin. Thereby, the bus bar and the terminal are integrally formed with the box body together. That is, the bus bar and the terminal are integrally formed with the box body by insert molding.

Heretofore, the above mentioned insert molding is formed by various molding production apparatus (for example, see a patent document 1). A molded article production apparatus shown in the patent document 1 has an insert molding machine, a robot as a transfer apparatus providing components into a die and a robot as a transfer apparatus removing a formed molding from the die.

Patent document 1:

Japan published patent application H9-201849

SUMMARY OF THE INVENTION

Objects to be Solved

The above mentioned molded article production apparatus shown in the patent document 1 has a robot for providing a component and a robot for removing a molded article, which is different from the robot for providing the component. It is required to act process for providing the component, and process for removing the molding in order. Thereby, working hours require long times, and production efficiency of the molding is down.

Furthermore, by having two robots, cost and space for arranging two robots increase.

Therefore, an objection of the present invention is to provide a transfer apparatus, which can control cost and space for arranging a machine, and a molded article production apparatus having the transfer apparatus.

How to Attain the Object of the Present Invention

According to a first aspect of the present invention, a transfer apparatus places a component for insert molding in a die, and removes a molding formed by the die from the die. The transfer apparatus has a base part, an attaching part and a moving part. The attaching part is able to mount the component and the molded article. The moving part is mounted on the base part and transfers the attaching part with respect to the die. The attaching part has a main body, a component attaching part and a molded article attaching part. The component attaching part is arranged on one surface side of the main body and mounts the component. The molded article attaching part is arranged on another surface side of the main body and mounts the molded article.

According to a second aspect of the present invention, as mentioned above, the component is transferred being attached to a jig. The jig has a member for preventing the component from falling out from the jig. The component attaching part has a holding part for attaching holding the jig. The attaching part has a component pressing part pressing the component toward the die from the jig.

According to a third aspect of the present invention, as mentioned above, the molded article production apparatus has a supplying part, a die, a carrying out part and a transfer apparatus. The supplying part provides a jig which mounts a component for insert molding. The die mounts the component and molds a molded article. The carrying out part conveys the jig, which the component is removed from, and a molding including the component. The transfer apparatus mounts the jig provided from the supplying part, provides the die with component attached to the jig, and carries the jig from which the component is removed and the molded article molded by the die to the carrying-out part.

Effect of the Invention

According to the invention, by positioning the attaching part in between the dies, the attaching part can attach a component for insert molding to the die, and removes the molded article from the die. Thereby, these actions, which mount the component for insert molding into the die and remove the molded article from the die, can perform continuously.

The attaching part mounts the component for insert molding on the die, and removes the molded article from the die. Thereby, it does not require having each transfer apparatuses for mounting the component for insert molding on the die, and for removing the molded article from the die.

Therefore, it is possible to improve work operation. Also, cost and space for arranging can be limited.

According to the invention, a fall of the jig from the attaching part and a fall of a component from the jig can be prevented. The component pressing part presses the component from the jig toward the die. Thereby, even if the component and the molded article are attached to the attaching part of one transfer apparatus, the component can be mounted on the die without the fall of the component. Therefore, the molded article can be formed certainly.

According to the invention, by having the above mentioned transfer apparatus, it is able to improve work operation. Also, cost and space for arranging can be limited.

The above and other objects and features of this invention will become more apparent from the following description taken in conjunction with the accompanying drawings.

DESCRIPTION OF THE PREFERRED EMBODIMENT

A molded article production apparatus according to one embodiment of the present invention is explained by referring to in FIG. 1-12.

Figure 1:
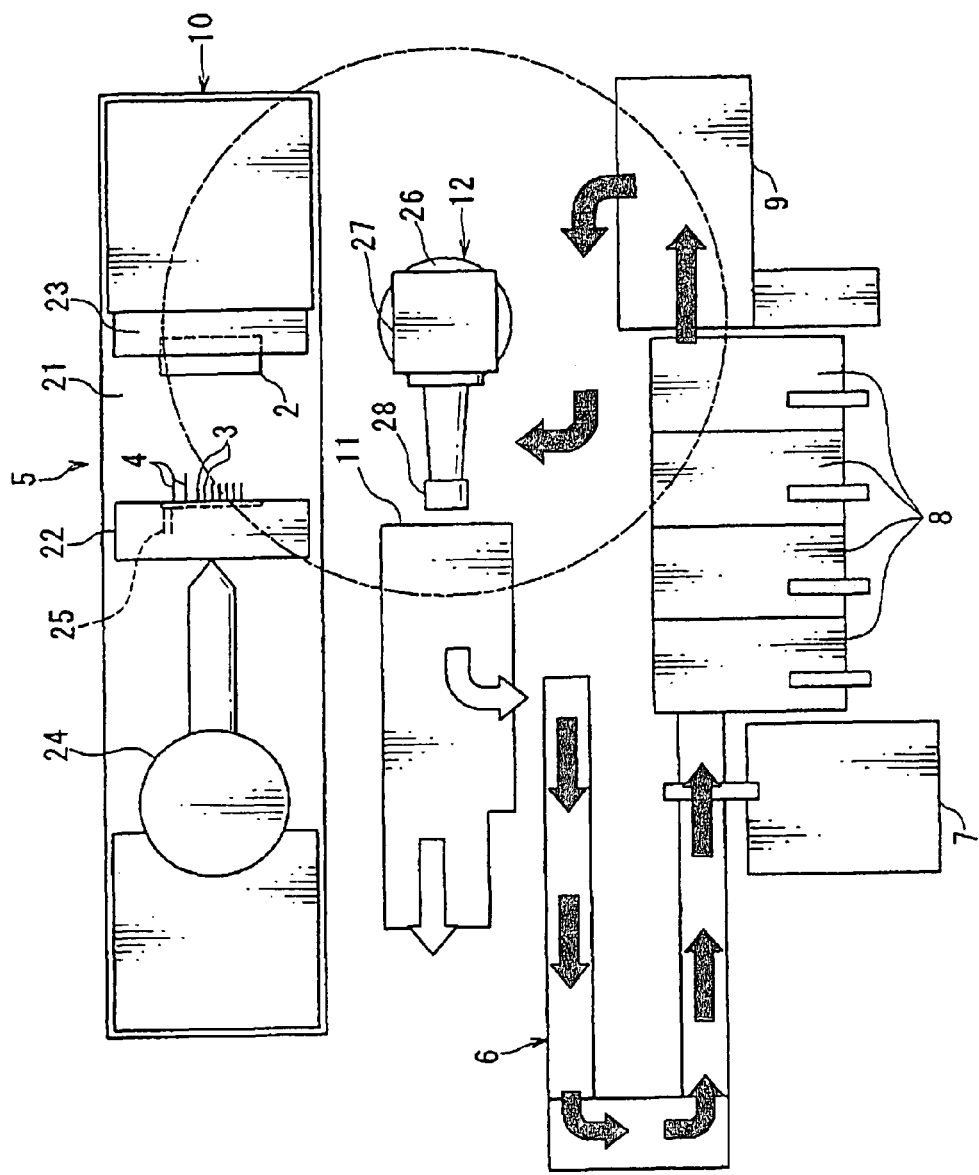
FIG. 1 is a plan view of a first embodiment of a molded article production apparatus according to the present invention.
Figure 11:
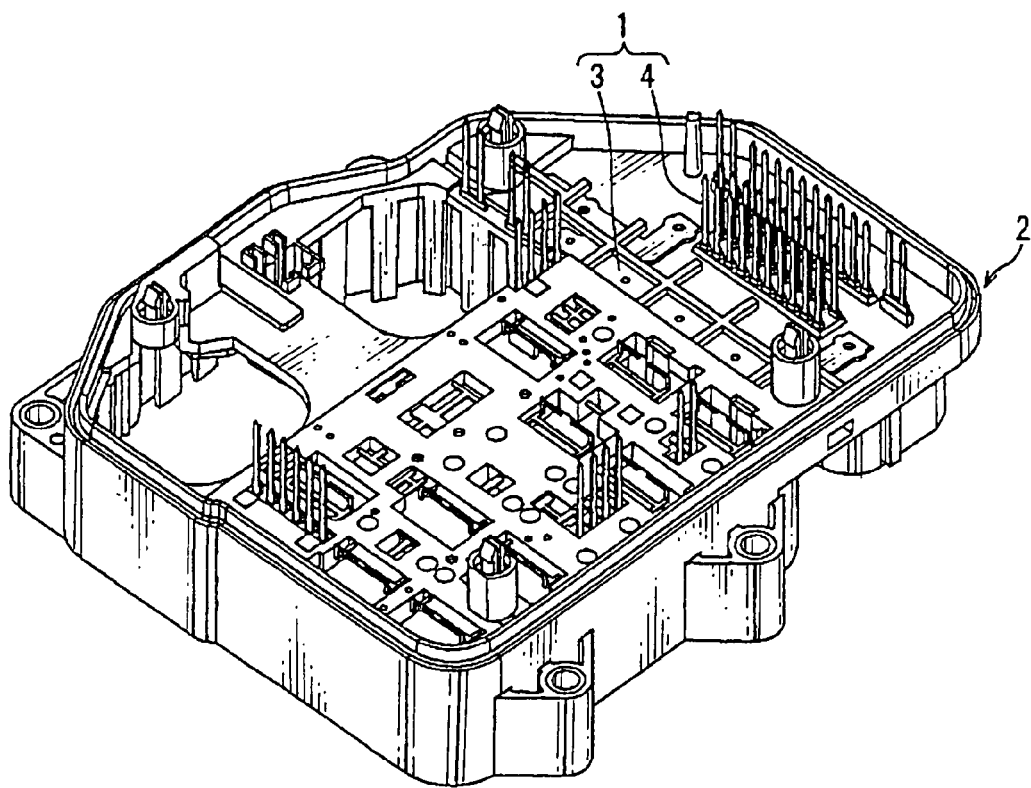
FIG. 11 is a perspective view showing a box body taken in the molding projection apparatus shown in FIG. 1.

A molded article production apparatus 5 shown in FIG. 1 forms a box body 2 burying a wiring block 1 of an electronic connection box shown in FIG. 11.

The box body 2 is made of an insulation synthetic resin, and is formed into a flat box shape. Electrical part, for example a relay or a fuse, and a connector of a wiring harness are mounted on the box body 2.

Figure 12:
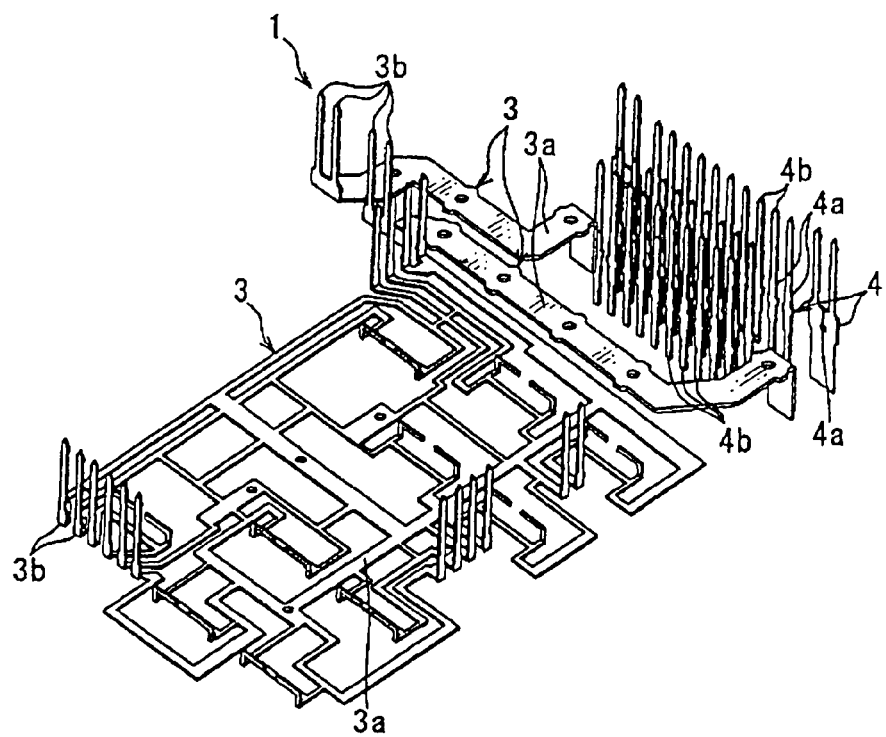
FIG. 12 is an exploded perspective view of a wiring block which is formed into an insert molding in the box body shown in FIG. 1.

As shown in FIG. 12, the wiring block 1 has a bus bar 3 and a terminal 4. The bus bar 3 is made by punching in a conductive plate, and is formed into a required shape. The bus bar 3 has a flat part 3a and a terminal part 3b. The flat part 3a is arranged in the center of the bus bar 3. The terminal part 3b is arranged in both ends of the flat part 3a, and connects with the electrical component or the terminal of the connector of the wiring harness.

The terminal 4 is made by punching in a conductive plate, and is formed into a bar shape. A step surface 4a is formed in a center of a longitudinal direction of the terminal 4. The step surface 4a is formed into a flat along a direction perpendicular to the longitudinal direction of the terminal 4. Also, an electrical contact part 4b, which connects with the electrical component or the terminal of the connector of the wiring harness, is arranged in both end of the longitudinal direction of the terminal 4.

The bus bar 3 and the terminal 4, that is, the wiring block 1, a part of it is buried in the box body 2 by insert molding. The wiring block 1 connects electrically the electrical component arranged in the box body 2 and the terminal of the connector of the wiring harness with a predetermined pattern each other. The bus bar 3 and the terminal 4 are a component for insert molding described in the present invention. The box body 2, which is made by insert molding of the bus bar 3 and the terminal 4, is a molding described in the present invention.

As shown in FIG. 1, the molded article production apparatus 5 has a first transfer unit 6, a bus bar attaching apparatus 7, a terminal mounting apparatus 8, a second transfer unit 9 as a supplying part, an injection molding apparatus 10, a carrying-out unit 11 as a carrying-out part and a transfer apparatus 12.

The first transfer unit 6 has an endless belt of ring shape by a driving power of a driving source such as a motor. The first transfer unit 6 is provided with the jig 13 (shown in FIG. 10), which the bus bar 3 and the terminal 4 are not mounted on, from the carrying-out unit 11. The first transfer unit 6 transfer the jig 13, which the bus bar 3 and the terminal 4 are not mounted on, to the bus bar attaching apparatus 7. A planar shape of the first transfer unit 6 is formed into U-shaped.

Figure 10:
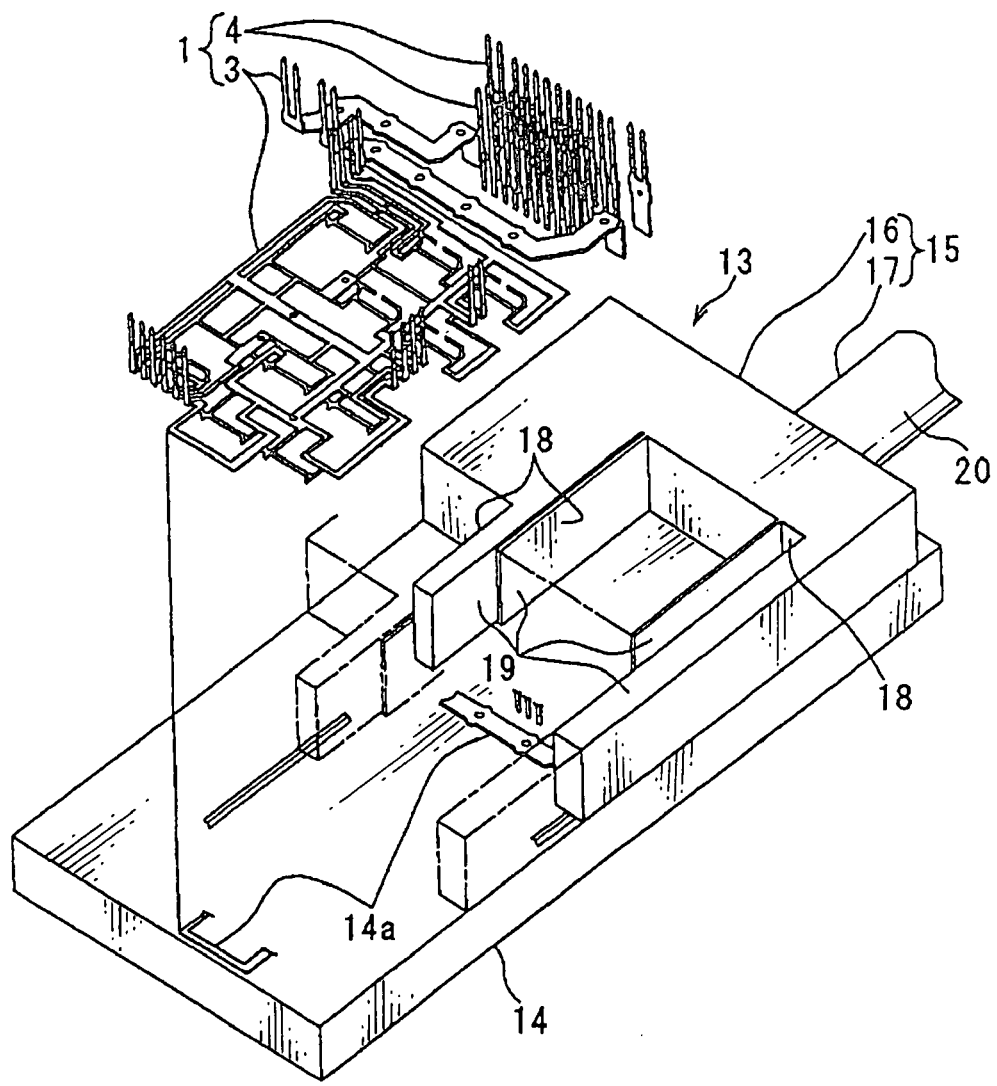
FIG. 10 is a perspective view showing structure of a jig used in the molded article production apparatus shown in FIG. 1.

As shown in FIG. 10, the jig 13 has a main body 14 and a member for preventing 15. The main body 14 is formed into a thick plate shape. A dent 14a is formed in accordance with an outer shape of the bus bar 3 and the terminal 4 in one surface of the main body. A planar shape of the main body 14 is formed into a rectangular shape. By positioning the bus bar 3 and the terminal 4 into the dent 14a, the main body 14 holds the bus bar 3 and the terminal 4 in a relative position when one component of the bus bar 3 and the terminal 4 are buried in the box body 2. A hole (not shown) passes through an later-described pressing rod 47 of a component pressing part 32 of the transfer apparatus 12, and the hole passes completely through the main body 14.

The member for preventing 15 has a top plate 16 and a cylinder 17 for sliding. The top plate 16 is formed into a thick plane shape, and is overlapped on the main body 14 and is slidably arranged in a longitudinal direction of the main body 14. Furthermore, the top plate 16 has a notch 18 and a supporting member 19. The notch 18 prevents interference of the terminal part 3b of the bus bar and the electrical contact part 4b of the terminal 4 when the top plate 16 slides in longitudinal direction of the main body 14. The supporting member 19 sandwiches the flat part 3a of the bus bar 3 and the step surface 4a of the terminal 4 between the main body 14 and the top plate 16.

The cylinder 17 for sliding has a cylinder 20, and a retractable rod from the cylinder 20. The cylinder 20 is mounted on the main body 14. The rod is arranged in parallel to a slide direction of the top plate 16, and is mounted on the top plate 16. The top plate 16 is moved by expanding and contracting the rod of the cylinder 17 for sliding in the range from position which do not sandwich the flat part 3a and the step surface 4a between the main body 14 and the 19 of the top plate 16, as shown solid line in FIG. 10, to position which sandwiches the flat part 3a and the step surface 4a between the main body 14 and the 19 of the top plate 16, as shown dash line in FIG. 10.

The member for preventing 15 prevents the bus bar 3 and the terminal 4 from coming off from the jig 13 when the supporting member 19 of the top plate 16 is placed in position sandwiching the flat part 3a and the step surface 4a, as shown in dot line of FIG. 10 between the main body 14 and the supporting member 19. When the supporting member 19 of the top plate 16 is placed in a position which do not sandwich the flat part 3a and the step surface 4a between the main body 13 and the supporting member 19, as shown in solid line of FIG. 10, the member for preventing 15 permits a fall of the bus bar 13 and the terminals 4 from the jig 13. Furthermore, the member for preventing 15 allows installing of the bus bar 3 and the terminal 4 into the dent 14a of the main body 14.

When the above mentioned jig 13 is provided for the first transfer unit 6 from the carrying-out unit 11, and is carried from the first transfer unit 6 to the bus bar attaching apparatus 7 and the terminal mounting apparatus 8 in order, the rod of the cylinder 17 for sliding is reduced. Furthermore, the member for preventing 15 is positioned in position which allows installing of the bus bar 3 and the terminal 4 into the dent 14a of the main body 14. When the jig 13 is carried in the injection molding apparatus 10 from the second transfer unit 9, absolutely the member for preventing 15 is positioned in position which permits installing of the bus bar 3 and the terminal 4 into the dent 14a of the main body 14.

The bus bar attaching apparatus 7 performs punching in a plate, and forms the bus bar 3 from the plate. Also, the formed bus bar 3 is mounted on the dent 14a of the main body 14 of the jig 13 (that is, the bus bar 3 is arranged in the jig 13), and is carried toward the terminal mounting apparatus 8.

As shown in Fig example, four terminal mounting apparatus 8 are arranged. Each terminal mounting apparatus 8 separates the terminal 4 of predetermined component number from connected terminals, and mounts the separated terminal 4 in the main body 14 of the jig 13. The terminal mounting apparatus 8 mounts the terminal 4 in order, and carries the jig 13, and transfers the jig 13 until the second transfer unit 9.

The second transfer unit 9 has an endless belt of ring shape by drive power of drive source of a motor as well as the described the first transfer unit 6. The jig 13, which is arranged in all of the bus bar 3 and terminal 4 from the terminal mounting apparatus 8, is provided for the second transfer unit 9. The second transfer unit 9 transfers the provided jig 13 to the transfer apparatus 12. As mentioned above, the second transfer unit 9 provides the jig 13 mounting the bus bar 3 and the terminal 4 into the transfer apparatus 12.

Figure 2:
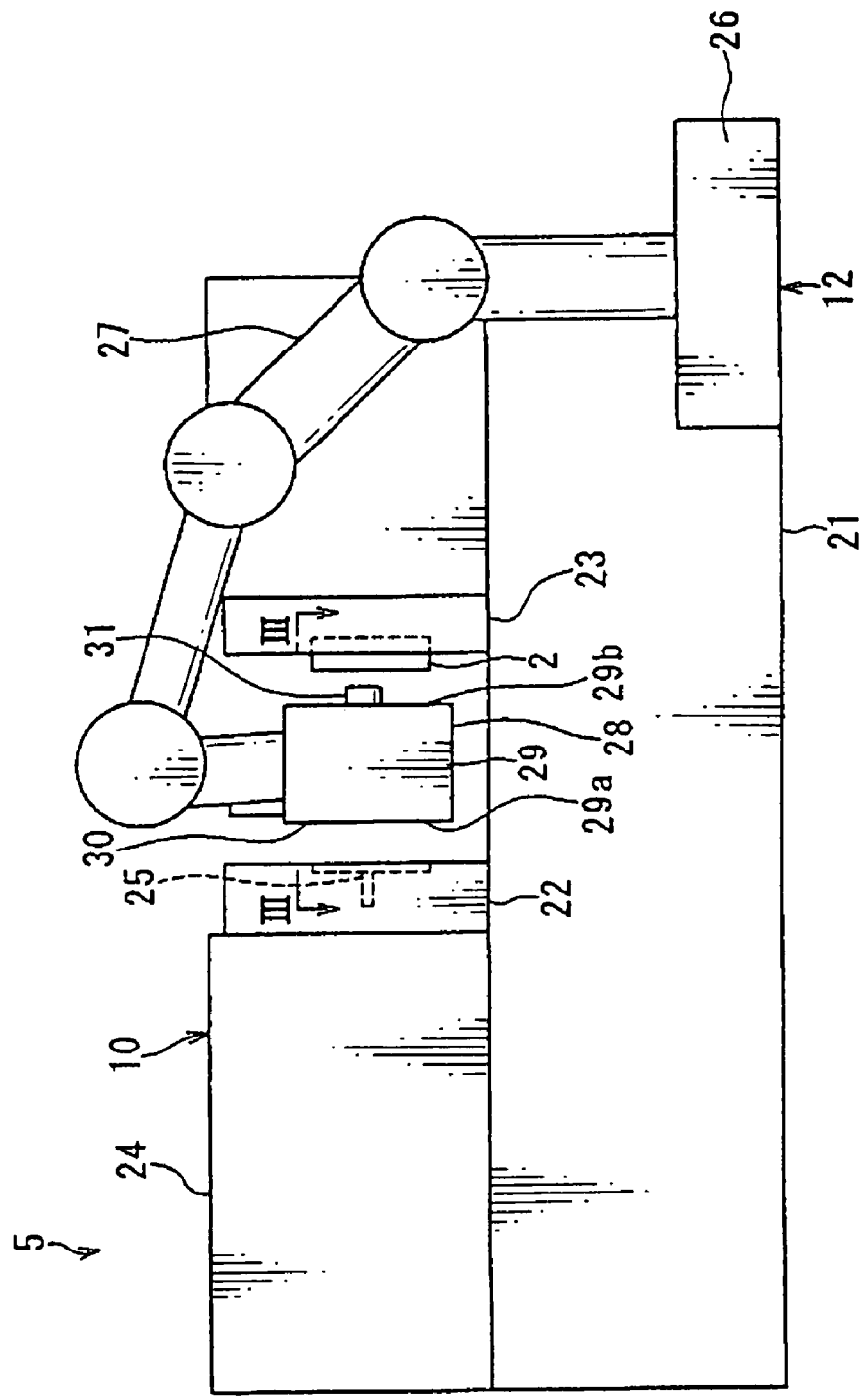
FIG. 2 is a lateral view of configuration of an injection molding apparatus and a transfer apparatus of the molded article production apparatus shown in FIG. 1.

As shown in FIG. 2, the injection molding apparatus 10 has an apparatus 21 arranged on the floor of a factory, a fixing die 22 arranged on the apparatus 21 (corresponding to a die), a moving die 23 arranged detachable on the fixing die 22 of the apparatus 21 (corresponding to a die), a moving mechanism transferring the moving die 23 and a injection machine 24. A cavity according to the outer shape of the above mentioned box body 2 is arranged in between the fixing die 22 and the moving die 23. An extrusion pin 25, which presses the box body 2 into the cavity to the moving die 23, is arranged in the fixing die 22.

The moving mechanism is arranged into the apparatus. The moving mechanism moves the moving die 23 against the apparatus 21 from position, which the cavity is closed by approaching the fixing die 22 from the moving die 23, to position which the cavity is opened by distancing the moving die 23 from the fixing die 22. The injection machine 24 fills a synthetic resin as molding material which is heated and plasticized into the cavity.

The carrying-out unit 11 is provided with the box body 2 having the bus bar 3 and the terminal 4, which are formed into an insert molding by the transfer apparatus 12, and the jig 13 which the bus bar 3 and the terminal 4 were removed from. The carrying-out unit 11 has an endless belt of ring shape by drive power of drive source of a motor as well as the described transfer unit 6 and 9.

The carrying-out unit 11 carries the box body 2 to next process of the box body 2, and carries the jig 13 to the first transfer unit 6. Therefore, the carrying-out unit 11 carries the jig, which the bus bar 3 and the terminal 4 are removed from, and the box body 2 including the bus bar 3 and the terminal 4 out.

As shown in FIG. 2, the transfer apparatus 12 has a base part 26, a robot arm 27 as a moving part and an attaching part 28. The base part 26 is arranged on floor of a factory. The robot arm 27 passes the center of the base part 26, is arranged rotatably around axis in parallel to vertical direction, and has a lot of joints. The robot arm 27 transfers the attaching part 28 arranged at the end of the robot arm 27 to the second transfer unit 9, and then the robot arm 27 transfers attaching part 28 between the die 22 and 23 in the injection molding apparatus, thereafter the robot arm 27 transfers the attaching part 28 to the carrying-out unit 11 by rotation.

Figure 3:
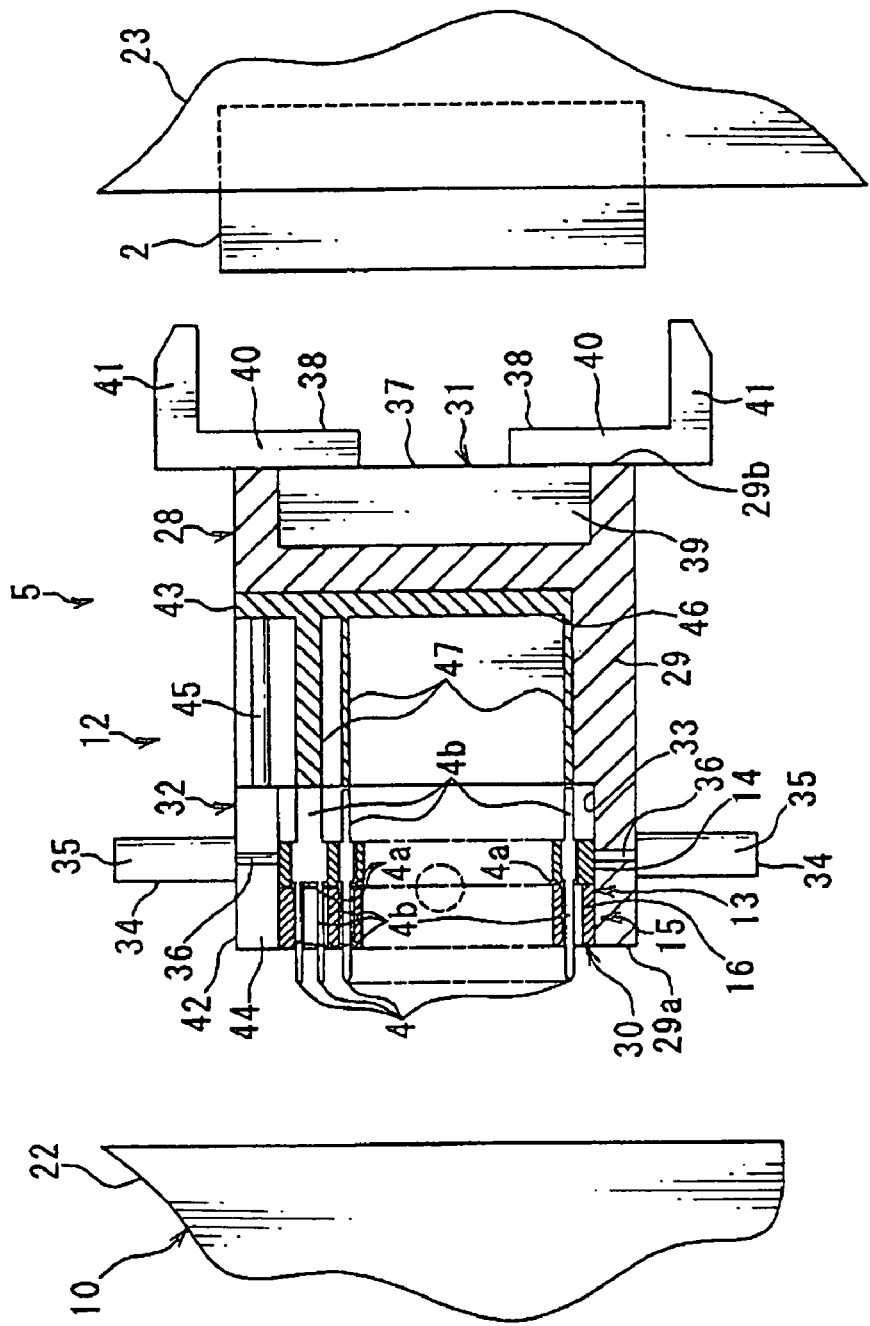
FIG. 3 is a sectional view taken along the line III-III in FIG. 2.

As shown in FIG. 3, the attaching part 28 has a main body 29 mounted in end of the robot arm 27, a component attaching part 30, a molded article attaching part 31 and a component pressing part 32. The main body 29 is formed into a thick flat shape.

The component attaching part 30 is arranged on one surface 29a opposite to the fixing die 22 when the main body 29 is positioned between the die 22 and the die 23. The component attaching part 30 has step-in 33 for holding and a pair of cylinders 34 for holding. The step-in 33 for holding is a step from the one surface 29a, and can hold the jig 13 inside thereof. The step-in 33 for holding is the holding part described in the claim of this invention.

The cylinder 34 for holding has a cylinder body 35 and a retractable rod 36 from the cylinder body 35. The cylinder body 35 of a pair of the cylinders 34 for holding is mounted on an outer wall surface of the main body 29 opposite to the step-in 33 for holding. The cylinder body 35, that is, the cylinder 34 for holding is mounted on a position which the extended rod 36 is projected into the step-in 33 for holding, and which the contracted rod 36 is not projected into the step-in 33 for holding. The cylinder 34 for holding holds the jig 13 into the step-in 33 for holding by extending the rod 36, and allows the jig to fall from the step-in 33 for holding by contracting the rod 36.

The component attaching part 30 receives the jig 13 arranging the bus bar 3 and the terminal 4 into the step-in 33 for holding. By extending the rod 36 of the cylinder 34 for holding, the jig 13, that is, the bus bar 3 and the terminal 4 are mounted on the attaching part 28.

The molded article attaching part 31 is arranged on another surface 29b opposite to the moving die 23 when the main body 29 is positioned between the die 22 and the die 23. The molded article attaching part 31 has a chuck cylinder 37 buried into the main body 29 and a pair of chuck members 38. The chuck cylinder 37 has a cylinder body 39 and a pair of detachable rods which is movably arranged in the cylinder body 39.

The chuck member 38 has a parallel part 40 in parallel to a moving direction of the rod and a supporting part 41 curved from end of the parallel part 40. The chuck member 38 is formed into an L-like form. The parallel part 40 of the chuck member 38 is mounted on the rod of the chuck cylinder 37 in condition that the supporting part 41 leaves space each other and is parallel.

The molded article attaching part 31 positions the box body 2, which is mounted on the moving die 23, between the supporting parts 41 of a pair of the chuck members 38. Thereafter, when the rod of the chuck cylinder 37 approaches each other, the molded article attaching part 31 sandwiches the box body 2 between the supporting parts 41, and mounts the box body 2 on the attaching part 28.

As shown in FIG. 3, the component pressing part 32 has a cylinder 42 for pressing and a pressing member 43. The cylinder 42 for pressing has a cylinder body 44, and a retractable rod 45 from the cylinder body 44. The cylinder body 44 is mounted on an end of the main body 29 in side of the component attaching part 30. A longitudinal direction of the rod 45 is in parallel to a longitudinal direction of the terminal 4 which is mounted on the jig 13 of the step-in 33 for holding.

The cylinder body 44 is arranged in condition that the expanding rod 45 approaches the molded article attaching part 31.

The pressing member 43 is received in the main body 29 of the attaching part 28, and is arranged between the component attaching part 30 and the molded article attaching part 31. The pressing member 43 has an end part 46 and a pressing rod 47. The end part 46 is formed into a thick flat plate shape. The rod 45 of the cylinder 42 for pressing is mounted on the end part 46. Also, both surfaces of the end part 46 are arranged in a direction perpendicular to a longitudinal direction of the terminal 4 and the cylinder 42 for pressing.

The pressing rod 47 is formed into a bar shape, and is arranged in a direction perpendicular to the surface of the end part 46. The pressing rod 47 extends from the end part 46 toward the terminal 4 and the bus bar 3, which are mounted on the jig 13 of the step-in 33 for holding. A longitudinal direction of the pressing rod 47 is in parallel to a longitudinal direction of the above mentioned terminal 4. When the rod 45 of the cylinder 42 for pressing is contracted, the terminal 4 and the bus bar 3, which are mounted on the jig 13 in the step-in 33 for holding, are arranged in pressing possible position through the hole.

When the rod 45 of the cylinder 42 for the pressing is contracted, and the pressing rod 47 of the pressing member 43 is passed into the hole, the above member pressing part 32 presses the terminal 4 and the bus bar 3 mounted on the jig 13 of the step-in 33 for holding. The component pressing part 32 presses the bus bar 3 and the terminal 4 toward the fixing die 22 from the jig 13 into the step-in 33 for holding. These bus bar 3 and terminal 4 are mounted on the cavity of the fixing die 22.

As described below, the above mentioned molded article production apparatus 5 forms the box body 2, which the bus bar 3 and the terminal 4 are buried in, into an insert forming. The transfer unit 6 is provided with the jig 13 which the bus bar and the terminal 4 are not mounted on. The bus bar 3 is mounted on the jig 13 by the bus bar attaching apparatus 7, and the terminal 4 is mounted on the jig 13 by the terminal mounting apparatus 8. Thereafter, the jig 13, which the bus bar 3 and the terminal 4 are mounted on, is carried near the transfer apparatus 12 by the second transfer unit 9.

The transfer apparatus 12 covers the step-in 33 for holding of the component attaching part 30 in the attaching part 28 with the jig 13 on the second transfer unit 9. The rod 36 of the cylinder 34 for holding of the component attaching part 30 in the attaching part 28 is extended by the transfer apparatus 12. The transfer apparatus 12 mounts the jig 13 into the step-in 33 for holding, that is, the jig 13 is mounted on the component attaching part 30. Furthermore, the transfer apparatus 12 extends the rod of the cylinder 17 for sliding in the member for preventing 15 of the jig 13, and sandwiches the bus bar 3 and the terminal 4 between the main body 14 and the top plate 16, and holds these bus bar 3 and terminal 4 in the jig 13.

As shown in FIG. 3, the transfer apparatus 12 positions the attaching part 28 between the die 22 and 23, which are separated from each other, by driving the robot arm 27. At this time, the component attaching part 30 is opposite to the fixing die 22, and the molded article attaching part 31 is opposite to the moving die 23. The molded box body 2 is mounted on the moving die 23.

Figure 4:
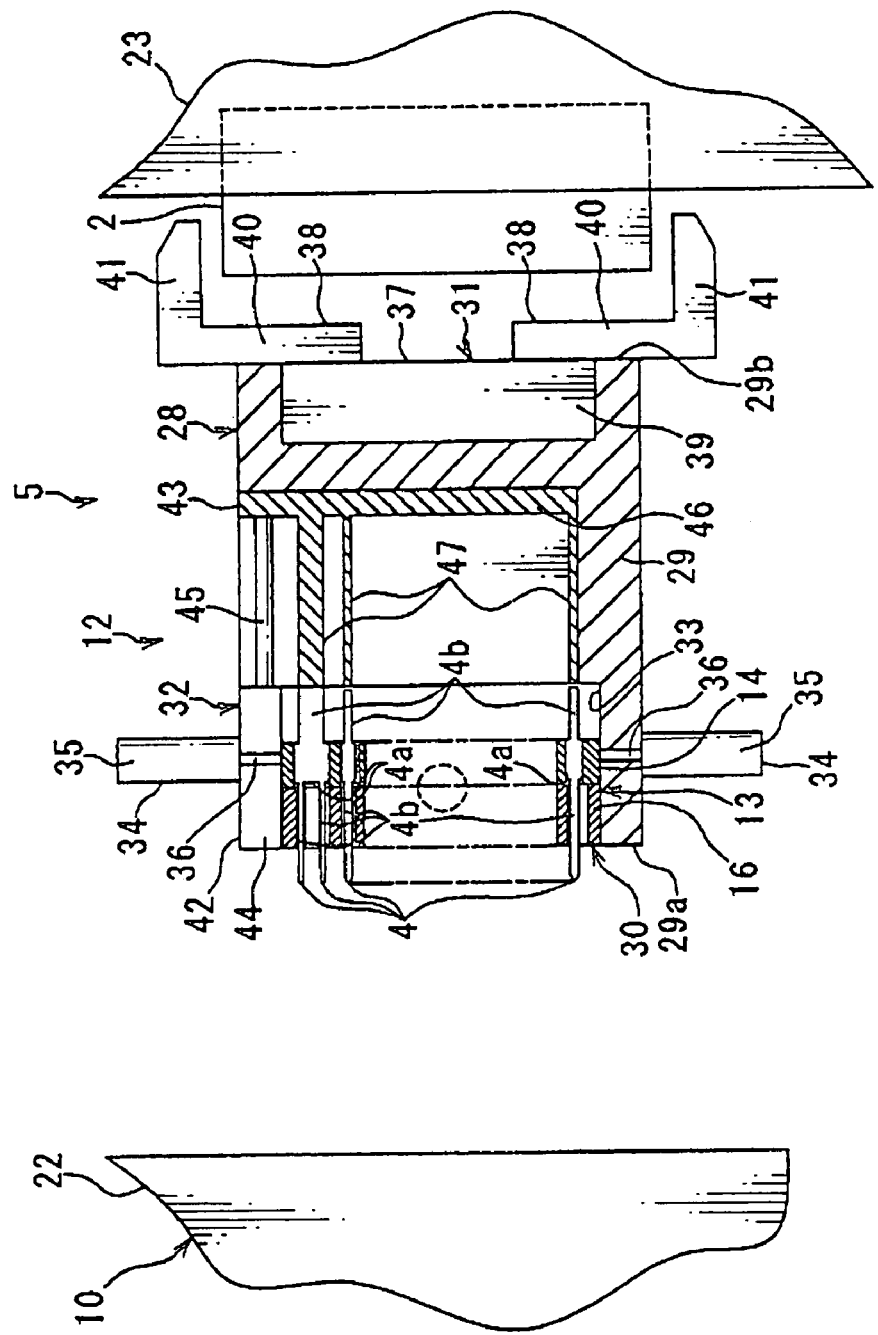
FIG. 4 is a sectional view showing an attaching part of the transfer apparatus shown in FIG. 3 close to a moving die.
Figure 5:
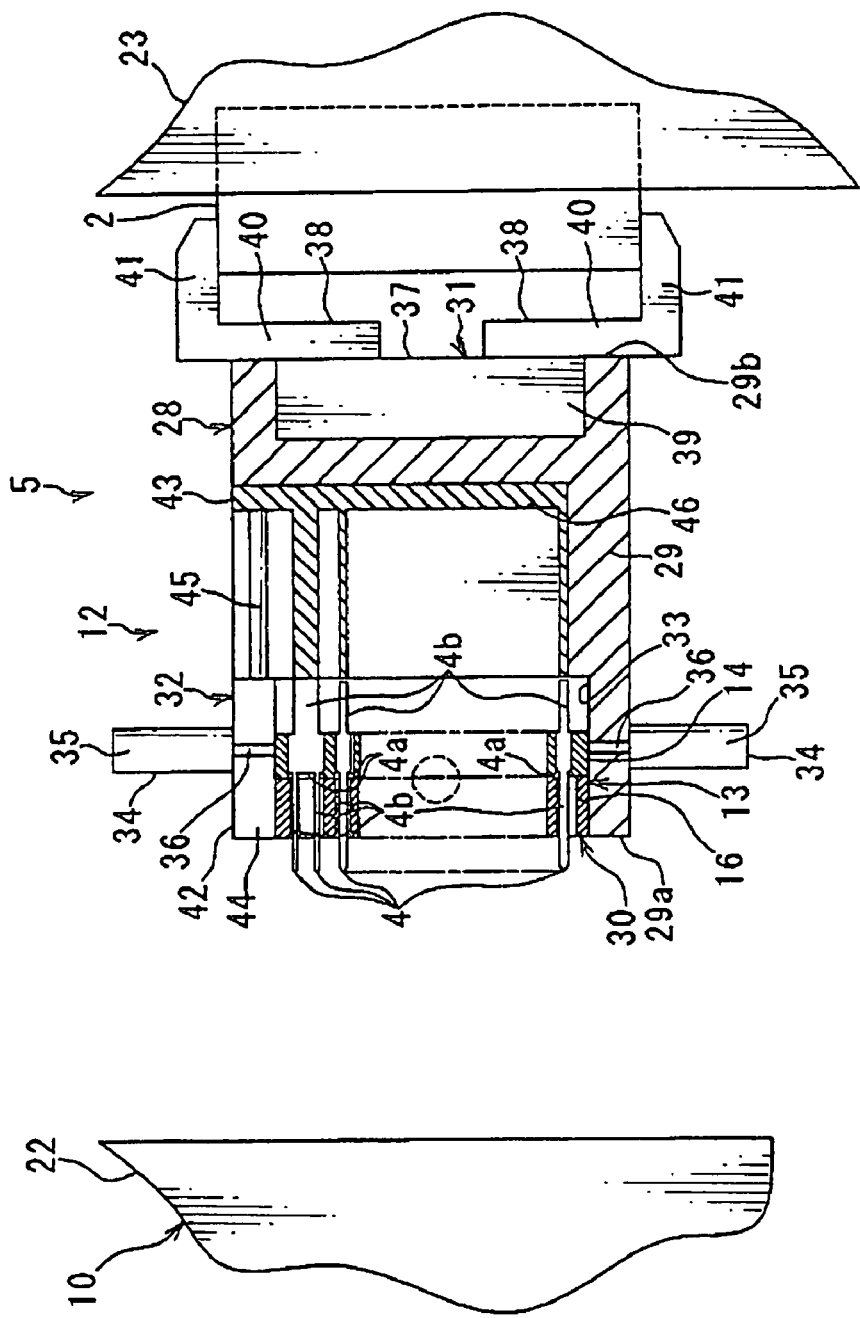
FIG. 5 is a sectional view showing that a chuck member of the attaching part in the transfer apparatus shown in FIG. 4 sandwiches the box body which is mounted in the moving die.

As shown in FIG. 4, the rod of the chuck cylinder 37, namely, both the chuck members 38, in condition that the chuck members are separated from each other, the robot arm 27 brings the molded article attaching part 31 of the attaching part 28 close to the moving die 23, and positions the box body 2 between a pair of the chuck members 38. Thereafter, as shown in FIG. 5, the rod of the chuck cylinder 37, that is, each chuck members 38 are approached to each other, and the box body 2 is sandwiched between a pair of the chuck members 38.

Figure 6:
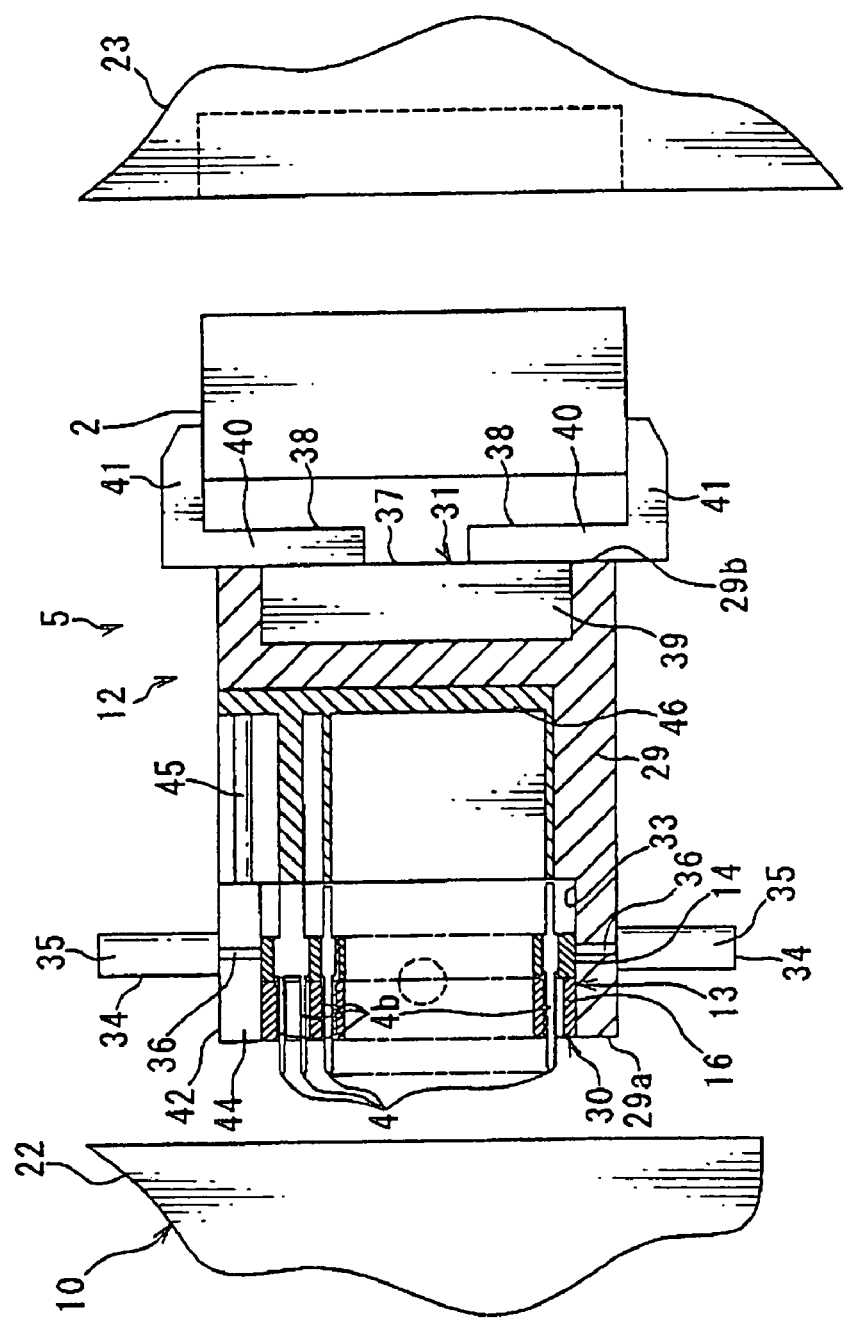
FIG. 6 is a sectional view showing that the attaching part of the transfer apparatus shown in FIG. 5 removes the box body from the moving die, and approaches a fixing die.
Figure 7:
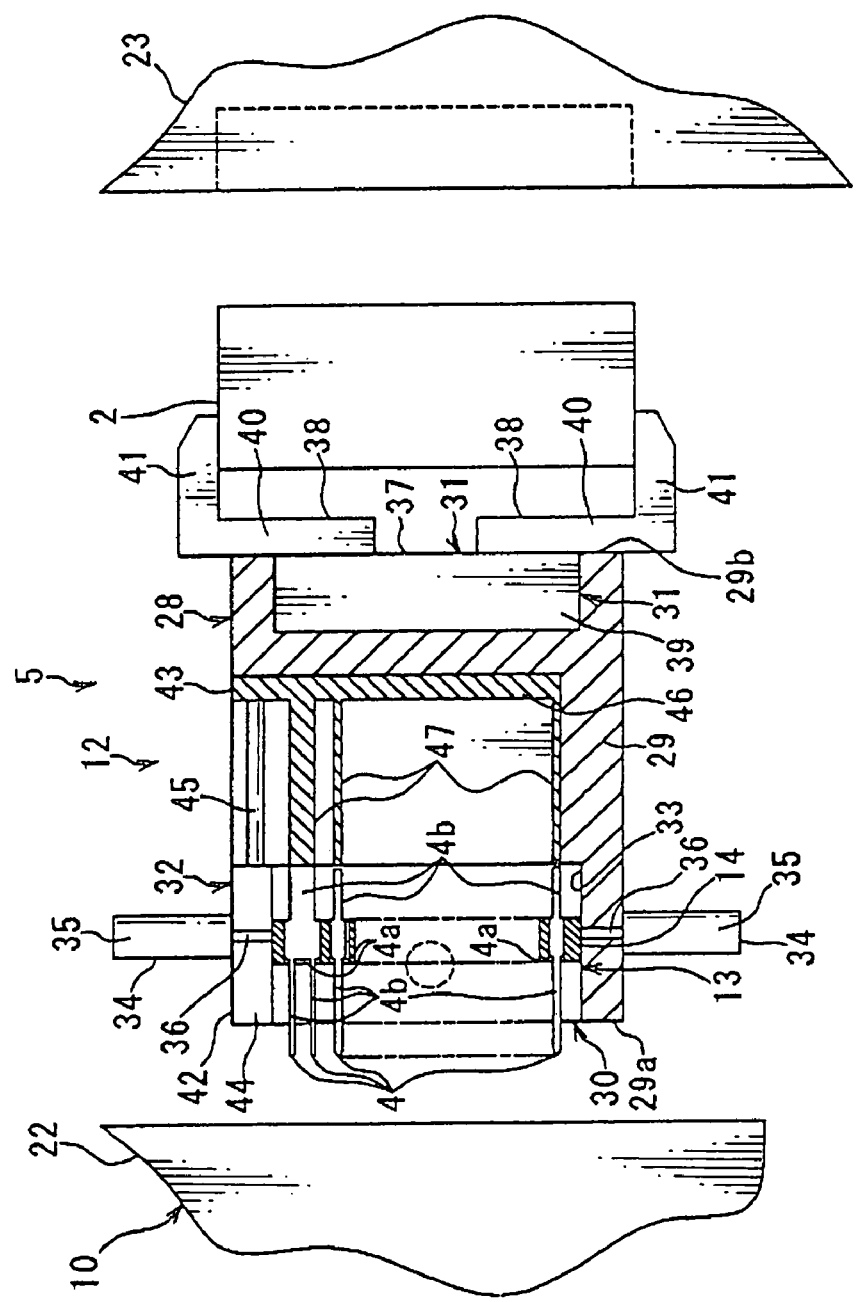
FIG. 7 is a sectional view showing that a rod of a cylinder for sliding of the jig, which is mounted on the attaching part of the transfer apparatus shown in FIG. 6, is reduced.

As shown in FIG. 6, the transfer apparatus 12 drives the robot arm 27, and moves the component attaching part 30 of the attaching part 28 close to the fixing die 22 in condition that the box body 2 is sandwiched between the chuck members 38. After, as shown in FIG. 7, the transfer apparatus 12 reduces the rod of the cylinder 17 for sliding in the jig 13, and stops sandwiching the bus bar 3 and the terminal 4 between the main body 14 and the top plate 16.

Figure 8:
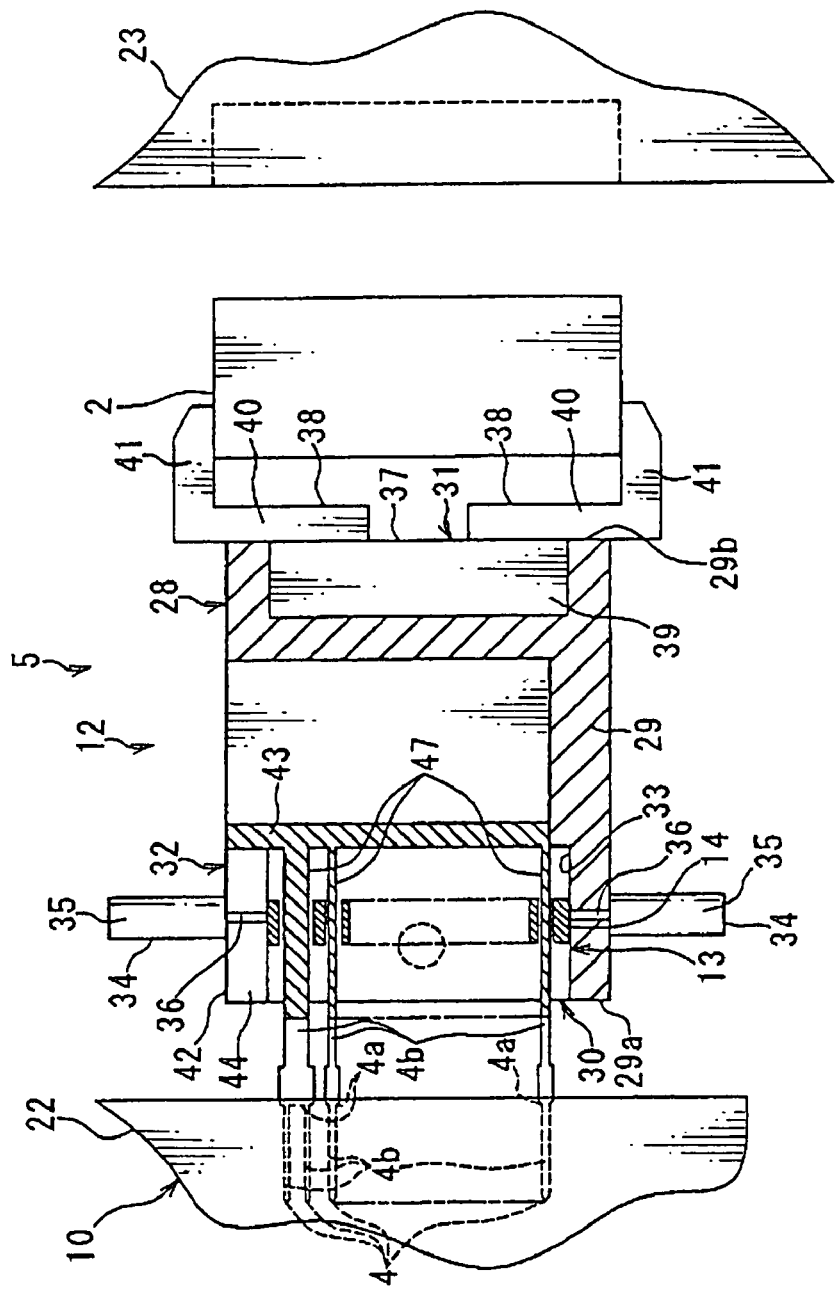
FIG. 8 is a sectional view showing a reduced rod of a cylinder for pressing of the attaching part of the transfer apparatus shown in FIG. 7.
Figure 9:
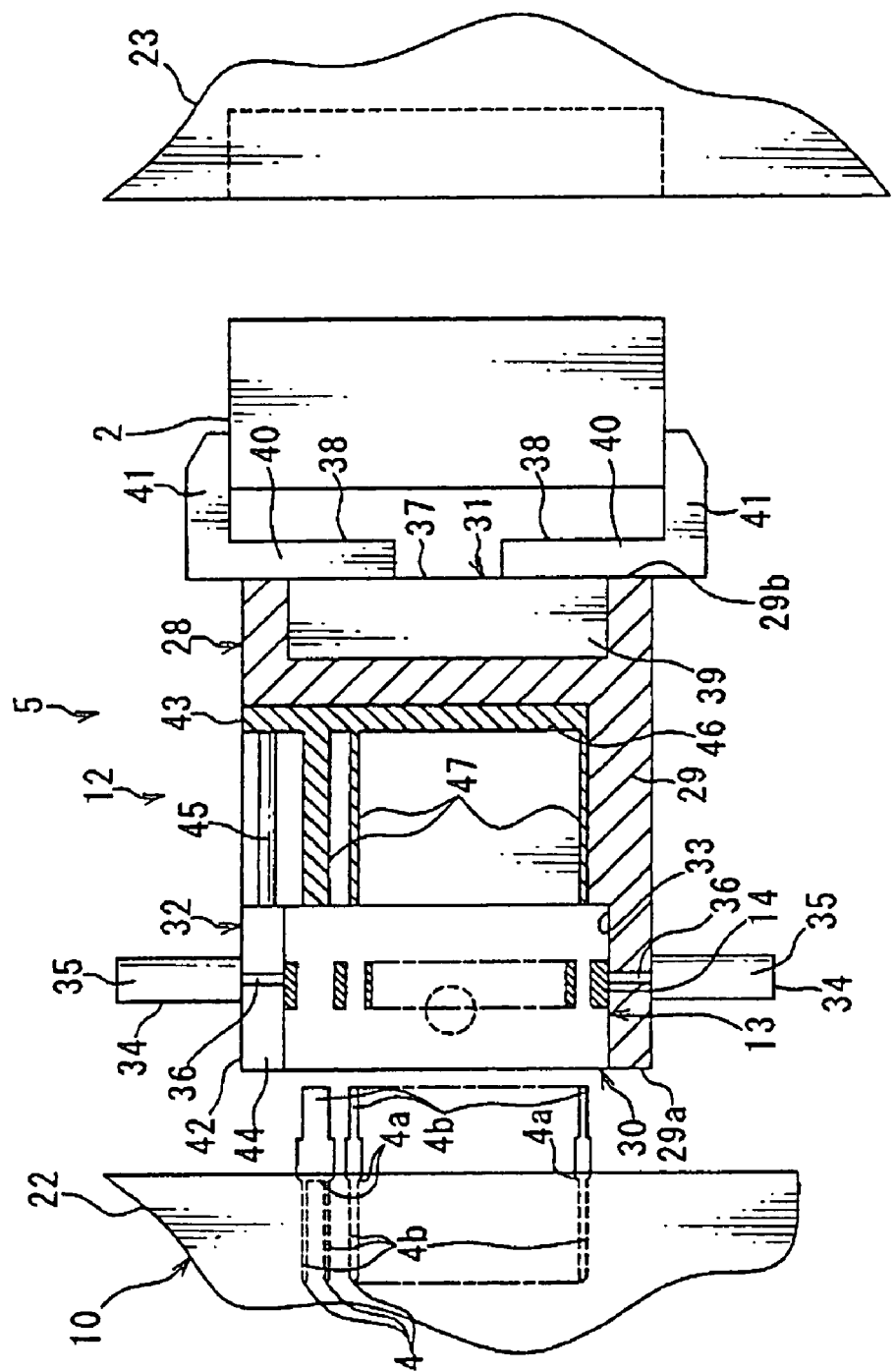
FIG. 9 is a sectional view showing the extended rod of the cylinder for pressing of the attaching part of the transfer apparatus shown in FIG. 8.

Thereafter, the transfer apparatus 12 reduces the rod 45 of the cylinder 42 for pressing in the member pressing part 32, and presses the bus bar 3 and the terminal 4 into the fixing die 22 by the pressing rod 47 of the pressing member 43. As shown in FIG. 8, the bus bar 3 and the terminal 4 are mounted on the fixing die 22. As shown in FIG. 9, the transfer apparatus 12 extends the rod 45 of the cylinder 42 for pressing in the member pressing part 32, and positions the attaching part 28 on the carrying-out unit 11 by driving the robot arm 27. The transfer apparatus 12 separates each chuck member 38 of the chuck cylinder 37, and mounts the box body 2 on the carrying-out unit 11. Furthermore, the transfer apparatus 12 reduces the rod 36 of the cylinder 34 for holding, and mounts the jig 13 on the carrying-out unit 11.

Thus, the transfer apparatus 12 mounts the jig 13 provided from the second transfer unit 9, and provides the bus bar 3 and the terminal 4 mounted on the jig 13 for the fixing die 22. Also, the transfer apparatus 12 carries the jig, which the bus bar 3 and the terminal 4 are removed, and the box body 2 which is formed by the die 22 and the die 23 to the carrying-out unit 11. As described above, the transfer apparatus 12 mounts the bus bar 3 and the terminal 4 into the fixed mold 22, and removes the box body 2, which is formed by the die 22 and 23, from the moving die 23.

The transfer apparatus 12 places the jig 13 and the box body 2 on the carrying-out unit 11. On the other hand, the injection molding apparatus 10 moves the moving die 23 close to the fixing die 22. After the cavity is closed, the cavity is filled with synthetic resin plasticized. The synthetic resin in the cavity becomes solidified, and the box body 2 is molded. Thereafter, the injection molding apparatus 10 presses the box body 2 in the cavity into the moving die 23 by the extrusion pin 25, and separate each the die 22 and the die 23. In addition, the box body 2 is mounted on the moving die 23. Thus, the above mentioned molded article production apparatus 5 forms the box body 2.

According to embodiments of the present invention, the component attaching part 30 is arranged on one surface 29a side of the main body 29 in the attaching part 28. The molded article attaching part 31 is arranged on another surface 29b side. Thereby, by positioning the attaching part 28 between the die 22 and 23, the bus bar 3 and the terminal 4 as a component of insert molding can be mounted into the fixing die 22. Also, the box body 2 as a molding can be removed from the moving die 23. Therefore, these actions, mounting the bus bar 3 and the terminal 4 into the fixing die 22 and removing the box body 2 from the moving die 23 can perform continuously.

The attaching part 28 mounts the bus bar 3 and the terminal 4 into the fixing die 22, and removes the box body 2 from the moving die 23. Thereby, it does not require arranging a transfer apparatus for mounting the bus bar 3 and the terminal 4 into the fixing die 22, and a transfer apparatus for removing the box body 2 from the moving die 23.

Therefore, working efficiency can be improved, and cost and space of the molded article production apparatus 5 can be controlled.

The member for preventing 15, which controls a fall of the bus bar 3 and the terminal 4, is arranged in the jig 13. The holding part 41 holding the jig 13 is arranged in the component attaching part 30 of the attaching part 28. Thereby, even if the jig 13 mounting the bus bar 3 and the terminal 4 is positioned in whatever place when the attaching part 28 is positioned between the die 22 and 23, a fall of the jig 13 from the attaching part 28, and a fall of the bus bar 3 and the terminal 4 from the jig 13 can be prevented.

Also, the attaching part 28 has the component pressing part 32, which presses the bus bar 3 and the terminal 4 into the fixing die 22 from the jig 13. Thereby, the bus bar 3 and the terminal 4 mounted on the jig 13 can be mounted into the fixing die 22 securely.

Therefore, even if the bus bar 3, the terminal 4 and the box body 2 are mounted on the attaching part 28 of one of the transfer apparatus 12, the bus bar 3 and the terminal 4 do not fall, and these can be mounted on the fixing die 22. Thereby, the box body 2 can be molded securely.

The molded article production apparatus 5 has the above mentioned transfer apparatus 12. Thereby, the working efficiency can be improved, and cost and space for inserting can be controlled.

According to the above mentioned embodiment, the box body 2 of an electronic connection box, which forms the bus bar 3 and the terminal 4 in a wiring harness 1 into an insert molding, is shown. However, the present invention can form various parts into insert molding not only the bus bar 3 and the terminal 4, and various parts not only the box body 2 of an electronic connection box can be formed. In short, the present invention can only form parts into insert molding.

While the invention has been described with reference to specific embodiments, the description is illustrative and not to be construed as limiting the scope of the invention. That is to say, various changes and modifications can be made without departing from the scope of the present invention.

What is claimed is:

1. A transfer apparatus mounting a component for insert molding on a die and removing a molded article molded by the die from the die, the apparatus comprising:
   a base part;
   an attaching part mounting the component and the molded article; and
   a moving part attached to the base part and moving the attaching part with respect to the die,
   wherein the attaching part includes:
   a main body;
   a component attaching part arranged on one surface side of the main body and mounting the component; and
   a molded article attaching part arranged on another surface side of the main body and mounting the molded article,
   wherein the component is transferred being attached to a jig, and the jig includes a member for preventing the component from falling out from the jig,
   wherein the component attaching part includes a holding part for holding the jig, and
   wherein the attaching part includes a component pressing part pressing the component toward the die from the jig.

2. A molded article production apparatus comprising:
   a supplying part supplying a jig which mounts a component for insert molding;
   a die mounting the component and molding an molded article;
   a carrying-out part carrying the jig from which the component is removed and the molded article including the component; and
   a transfer apparatus mounting the jig supplied from the supplying part, supplying the die with the component attached to the jig, and carrying the jig from which the component is removed and the molded article molded by the die to the carrying-out part,
   wherein the transfer apparatus is a transfer apparatus mounting a component for insert molding on a die and removing a molded article molded by the die from the die, the apparatus comprising:
   a base part;
   an attaching part mounting the component and the molded article; and
   a moving part attached to the base part and moving the attaching part with respect to the die,
   wherein the attaching part includes:
   a main body;
   a component attaching part arranged on one surface side of the main body and mounting the component; and
   a molded article attaching part arranged on another surface side of the main body and mounting the molded article.

3. A molded article production apparatus comprising:
   a supplying part supplying a jig which mounts a component for insert molding;
   a die mounting the component and molding an molded article;
   a carrying-out part carrying the jig from which the component is removed and the molded article including the component; and
   a transfer apparatus mounting the jig supplied from the supplying part, supplying the die with the component attached to the jig, and carrying the jig from which the component is removed and the molded article molded by the die to the carrying-out part,
   wherein the transfer apparatus is the transfer apparatus as claimed in claim 1.

* * * * *